May 12, 1959     N. E. OBACK ET AL     2,885,793
EDUCATIONAL MECHANICAL BUILDING TOY
Filed April 14, 1955     2 Sheets-Sheet 1
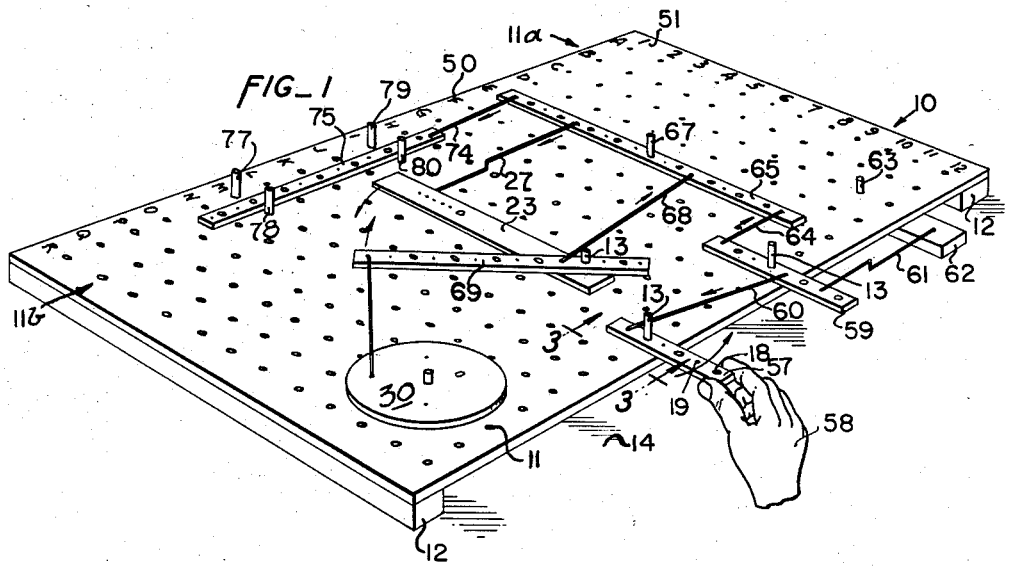
FIG_1
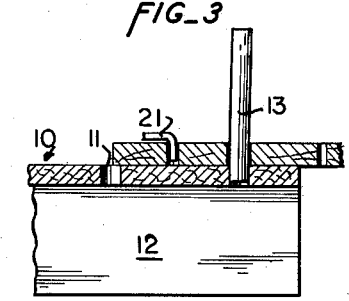
FIG_3
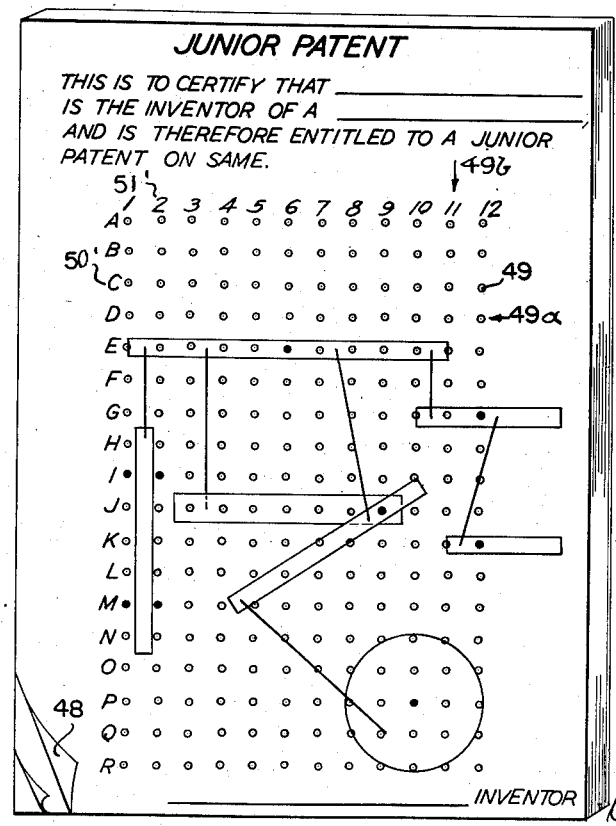
FIG_2
INVENTORS
NELS E. OBACK
LEONARD G. STANLEY
BY Hansen and Lane
ATTORNEYS

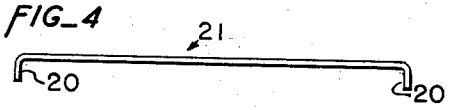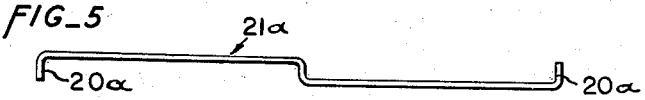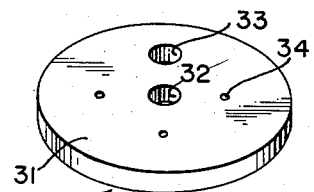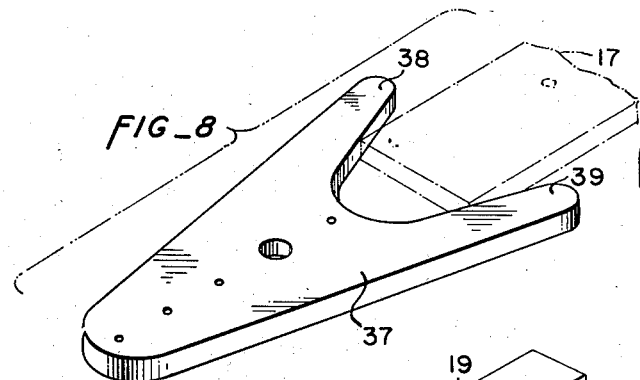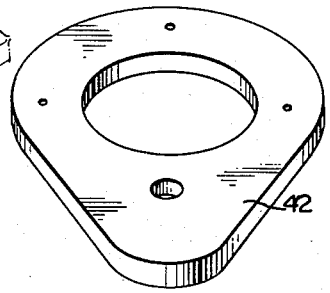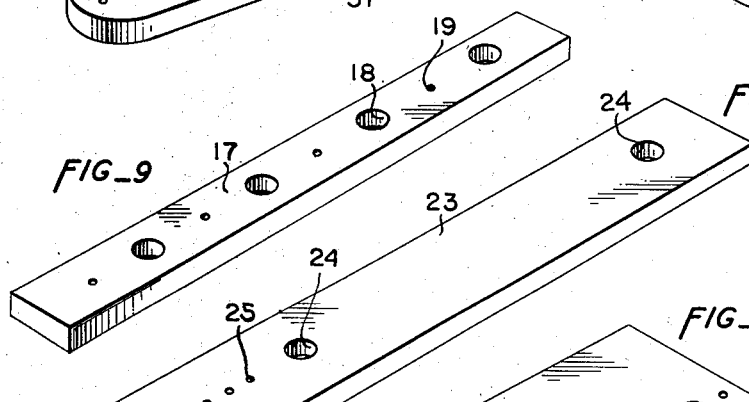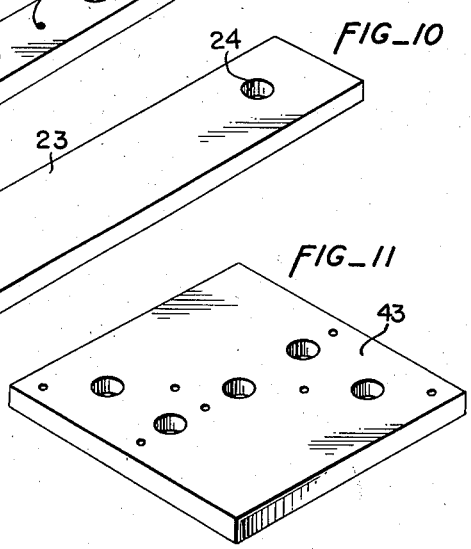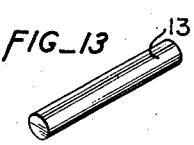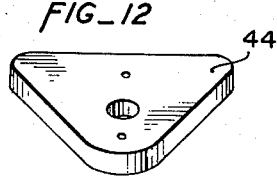

United States Patent Office 2,885,793
Patented May 12, 1959

2,885,793

EDUCATIONAL MECHANICAL BUILDING TOY

Nels E. Oback, Los Gatos, and Leonard G. Stanley, Cupertino, Calif.

Application April 14, 1955, Serial No. 501,382

3 Claims. (Cl. 35—13)

The present invention relates to game toys, and pertains more particularly to an educational building toy for combined amusement and the teaching of basic principles of mechanics.

An object of the invention is to provide a mechanical game toy which may be used by children and persons of all ages for entertainment and for assistance in learning basic mechanical actions and reactions.

Another object is to provide a mechanical building toy wherein various parts thereof may be pivotally mounted and connected by various linkages to produce mechanical interaction among the parts.

A further object of the invention is to provide an improved mechanical building toy which may be used for the building of models of various mechanical devices, and to provide, in conjunction therewith, a pad laid out to correspond to a game board of the device for use in drawing various arrangements on the game board.

A still further object of the invention is to provide a simple, perforated game board with a plurality of pegs for mounting in the perforations in the game board, and a plurality of game pieces with holes therein for mounting on pegs inserted in the perforations in the game board, wire linkages of various lengths and configurations being provided for mechanically interconnecting selected game pieces on the game board.

These and other objects and advantages of the invention will be apparent from the following description and the accompanying drawings, wherein:

Fig. 1 is a perspective view of a game toy embodying the present invention as it appears when erected and in operation.

Fig. 2 is a perspective view of a pad for use in drawing various mechanical arrangements created on the game board.

Fig. 3 is an enlarged fragmentary sectional view taken along line 3—3 of Fig. 1.

Figs. 4 and 5 are side elevational views of two types of linkages used in interconnecting pivotally mounted game pieces.

Figs. 6, 7 and 8 are perspective views of three different types of game pieces for use on the board shown in Fig. 1.

Figs. 9 and 10 are perspective views of what may be considered basic game pieces.

Figs. 11 and 12 are perspective views of still other types of game pieces.

Fig. 13 is a perspective view of a peg for use in pivotally mounting game pieces on the game board.

Referring to the drawings in detail, a game toy A embodying the present invention comprises a game board 10 which may be a piece of the widely advertised commercial product known as "Peg Board" which consists of a hard panel of compressed wood fibre, with holes 11 therethrough arranged in rows 11a and 11b at predetermined spaced intervals on a right angle grid pattern. On the commercially available board, the holes 11 are approximately one-quarter inch in diameter, and are spaced apart on one-inch centers, but in the event that the game board 10 is fabricated from a solid sheet of suitable material, the spacing of the holes may be as desired.

A suitable size of playing board 10 provides approximately eighteen transversely extending rows 11a of holes and twelve lengthwise extending rows 11b. However, the size of the board and the number and arrangement of the holes is optional.

The game board 10 preferably is supported on transverse base strips 12 of a width less than the separation between adjacent rows of holes 11 so as not to interfere with the full insertion of a peg 13 (Figs. 1 and 13) into any of the holes.

A plurality of pegs 13 are provided of a diameter to fit into the holes 11 in the game board 10, and preferably are somewhat longer than the thickness of the base strips 12 plus the thickness of the game board 10, so that even when fully inserted into one of the holes 11 so as to contact a supporting surface 14 upon which the game board may be placed, the pegs will still project above the upper surface of the game board a distance sufficient to provide a pivotal mounting support for a game piece.

A convenient material for making the pegs 13 is wooden doweling of a size to fit into the holes 11. If desired, however the pegs may be of plastic or other suitable material.

A plurality of game pieces, such as, for example, the game piece 17 of Fig. 9, are provided for use on the game board 10. These game pieces may be all of one design, or may, if preferred, be of a wide variety of designs. Each game piece comprises essentially a piece of sheet material, such as wood, plastic, or other suitable material, with one or more larger holes 10 therein for pivotally mounting the game piece on a peg 13, and one or more smaller holes 19 therein for receiving the bent end portion of a connecting link, for example, the end portion 20 of the link 21 (Fig. 4), or the bent end portion 20a of the link 21a (Fig. 5).

The game piece 17 (Fig. 9) may be considered a basic game piece, since by using a plurality of these game pieces plus a plurality of pegs 13 and links such as, for example, the link 21 (Fig. 4) a wide variety of mechanical arrangements can be devised on the game board 10.

The game piece 17 preferably is of a width less than the distance separating adjacent rows of holes 11a and 11b in the game board 10, and may be of any reasonable length. Several different lengths of game pieces preferably are provided to allow for variation in their arrangement. Each game piece 17 has one or more larger holes 18 disposed along its longitudinal center line, and preferably spaced apart on centers equal to the spacing of adjacent holes 11 in the rows 11a and 11b on the game board 10.

Various other types of links and game pieces may be devised as desired. For example, in Figs. 1 and 10, a game piece 23 is provided having therein two larger holes 24 for use, selectively, in mounting the game piece on a pivot peg 13. A plurality of aligned, small, closely spaced holes 25 also are provided for connecting the game piece to a link, such as the link 27 (Fig. 1) at a selected distance from the pivotal mounting axis of the peg 13 inserted in one of the larger holes 24.

The game piece 30 (Fig. 6) consists of a disk 31 with one concentric and one eccentric peg-receiving holes 32 and 33 respectively, and a plurality of smaller link connecting holes 34.

In Fig. 8, a game piece 37 is yoke shaped, the bifurcated ends 38 and 39 of which may be mounted to span the end of one of the other game pieces, for example, the game piece 17 shown in Fig. 9. When thus mounted, upon oscillation of the game piece 17 within the bifurcated end portions 38 and 39 of the yoke member, the yoke member 37 will be oscillated thereby.

The other game pieces illustrated, such as the game piece 42 shown in Fig. 7, the rectangular game piece 43 shown in Fig. 11, and the rounded apex. triangular game piece 44 shown in Fig. 12, may be provided if desired, either as part of the original sets, or as accessory pieces, according to the elaborateness of the set. The number and variety of the game pieces is limited only by the ingenuity of the players for which the game is intended.

To encourage competition between individual players, and to permit the keeping of a record of ingenious arrangements created, and also to teach the drawing of mechanical arrangements, a paper tablet or pad 47 preferably is provided, with each sheet 48 thereof laid out with a grid of dots 49 corresponding to the arrangement of the holes 11 in the game board 10. The transverse rows of dots 49a represent the rows 11a of holes in one direction of the game board (Fig. 1) while the lengthwise extending rows 49a of dots represent the lengthwise extending rows 11b of holes in the game board. Letter indicia 50 may be used to designate the transverse rows 11a of holes in the game board and number indicia 51 may be used to designate lengthwise extending rows 11b of the board. Corresponding indicia 50' and 51' may be used to designate corresponding rows 49a and 49b of dots on the tablet pages 48.

A player or student thus may easily sketch a representation of a desired arrangement of game pieces on the game board 10 on a sheet 48 of the pad 47 as indicated in Fig. 2. The top several sheets of the pad 47 may have imprinted thereon some representative layouts of interesting arrangements to assist the new player in visualizing the possibilities of the game.

The invention provides interesting diversion for people of almost all ages. Since the larger, or peg-receiving holes 18 in the game pieces 17 are spaced apart on centers corresponding to those of the holes 11 in the game 10, each of the game pieces 17 may be pegged to the game board by one or more pegs. When pegged to the board by only one peg, the game piece is pivotally movable on the peg, while when pegged to the board by more than one peg, the game piece is anchored against pivotal movement. This feature provides an interesting and possibly instructive pastime for a very young child, say of the age of three or thereabouts, since he can peg the game pieces to the board by several pegs each.

For older children, and even for adults, the invention becomes increasingly attractive as their ability to devise and operate more ingenious arrangements increases. For example, in the arrangements illustrated in Fig. 1, the game piece 57 being manipulated as a lever by the hand 58 will, when swung in the direction of the arrow, urge a second game piece 59 to swing in the opposite direction by its interconnection therewith through the link 60.

A link 61 also connects the second game piece 59 to a game piece 62 pivotally mounted beneath the game board 10 on a peg 63. The second game piece 59 also is connected by a link 64 to a long game piece 65, which is pivotally mounted on a peg 67 fitted into a hole 11 in the game board. This long game piece 65 is connected by a link 68 to the uppermost game piece 69 of a pair thereof pivoted on the single peg 13 referred to previously herein.

The link 27 is connected from the long game piece 65 on the opposite side of its pivot peg 67 from the link 68 to the lowermost game piece 23 of the pair thereof on its pivot peg 13. Thus, pivotal movement of the long game piece 65 causes the superposed co-axially pivoted game pieces 69 and 23 to operate with a scissors action.

Also in Fig. 1, a link 74 connects the long game piece 65 to an axially reciprocating strip 75 which is guided for axial movement between four pegs 77, 78, 79 and 80 inserted in holes 11 in the game board.

From this illustration it is obvious that the game pieces illustrated in Figs. 6, 7, 8, 11 and 12 may be mounted on pegs 13 inserted in holes 11 in the game board and connected by various linkages to provide innumerable interesting and instructive arrangements as suggested by that illustrated in Fig. 1, and described herein.

While we have illustrated and described a preferred embodiment of the present invention, it will be understood however, that various changes and modifications may be made in the details thereof without departing from the scope of the invention as set forth in the appended claims.

Having thus described the invention, what we claim as new and desire to protect by Letters Patent is defined in the following claims.

1. An educational game toy comprising a game board having a plurality of symmetrically arranged holes therein, a plurality of pegs adapted to be fitted with a snug retaining fit into selected ones of said holes, a plurality of game pieces each having a hole therein adapted to receive for free pivotal movement therein a selected one of said pegs inserted in a hole in the game board, each game piece having a plurality of additional smaller holes therein at spaced intervals throughout its length, and a plurality of stiff wire links of different lengths, each link having a short portion at each end thereof bent at right angles to the remainder of the link and adapted to be inserted for free pivotal movement into a selected smaller hole in each of a pair of said game pieces pivotally mounted on pegs inserted in the holes in said game board for linked interconnection of such game pieces whereby selected pluralities of said game pieces may be pivotally mounted on said pegs inserted in selected holes in said game board, and linked together in sequence by a plurality of said wires, so that upon a pivotal movement of one of said pivotally mounted game pieces, the interconnecting wire links transmit such motion by link and lever action to the other pivotally mounted game pieces connected by said links in sequence thereto.

2. An arrangement according to claim 1 wherein the holes are arranged in a rectangular grid pattern.

3. An arrangement according to claim 1 wherein the game pieces are of a width less than the separation between pegs in adjacent holes in the game board, and a game piece mounted for guided longitudinal movement between such adjacent pegs.

References Cited in the file of this patent

UNITED STATES PATENTS

| | | |
|---|---|---|
| 2,382,982 | Elliott | Aug. 21, 1945 |
| 2,568,557 | Newbery | Sept. 18, 1951 |
| 2,625,769 | Hubbard | Jan. 20, 1953 |

FOREIGN PATENTS

| | | |
|---|---|---|
| 509,697 | France | Nov. 17, 1920 |
| 840,934 | France | May 8, 1939 |
| 988,597 | France | Aug. 29, 1951 |